R. W. TULLY.
ARTIFICIAL HEDGE, LAWN, AND SIMILAR ARTICLE.
APPLICATION FILED OCT. 16, 1918.

1,386,450.

Patented Aug. 2, 1921.

WITNESSES

INVENTOR
Richard Walton Tully
BY
ATTORNEYS

UNITED STATES PATENT OFFICE.

RICHARD WALTON TULLY, OF SIERRA MADRE, CALIFORNIA.

ARTIFICIAL HEDGE, LAWN, AND SIMILAR ARTICLE.

1,386,450.  Specification of Letters Patent.  Patented Aug. 2, 1921.

Application filed October 16, 1918. Serial No. 258,352.

*To all whom it may concern:*

Be it known that I, RICHARD WALTON TULLY, a citizen of the United States, and a resident of Sierra Madre, in the county of Los Angeles and State of California, have invented a new and Improved Artificial Hedge, Lawn, and Similar Article, of which the following is a full, clear, and exact description.

The object of the invention is to provide a new and improved artificial hedge, lawn or similar article, for use in stage settings or for camouflage purposes and the like and arranged to closely imitate a natural hedge, lawn or the like. Another object is to provide an exceedingly strong and durable structure which can be readily moved about and used wherever required. Another object is to permit of manufacturing the artificial hedge, lawn or similar article at a comparatively low cost.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

The body 10 of the artficial hedge, lawn or similar article is in the form of a woven textile fabric of a green color and having its warp and weft threads preferably made of coarse fibers such as cocoa fiber, manila hemp and the like. Short strands 11 of similar material are tied or otherwise fastened to the body 10 to project from the face of the said body thereby resembling grass, twigs and the like. Each of the strands 11 is preferably tied approximately at its middle to a warp or weft of the body 10 and the several strands 11 are tied in at the body at places spaced apart but in such close relation that the loose ends of the strands closely imitate grass growing on a lawn or twigs on a hedge or the like. It will be noticed that the loose ends of the strands 11 are unsupported and assume various shapes, and as the said strands with their loose ends are promiscuously distributed over the face of the body 10 it is evident that a close imitation of a lawn or the like is produced.

Each of the strands 11 is made of the same coarse fibrous material of which the body 10 is made and is likewise green. Each strand 11 is made of, at least, two threads twisted together, each thread being formed of a large number of coarse filaments such as cocoa fiber, manila hemp and the like and the filaments for each thread of the strand are twisted together but their terminals are preferably arranged untwisted so as to present tufts thus giving more density to the article.

Figure 1:
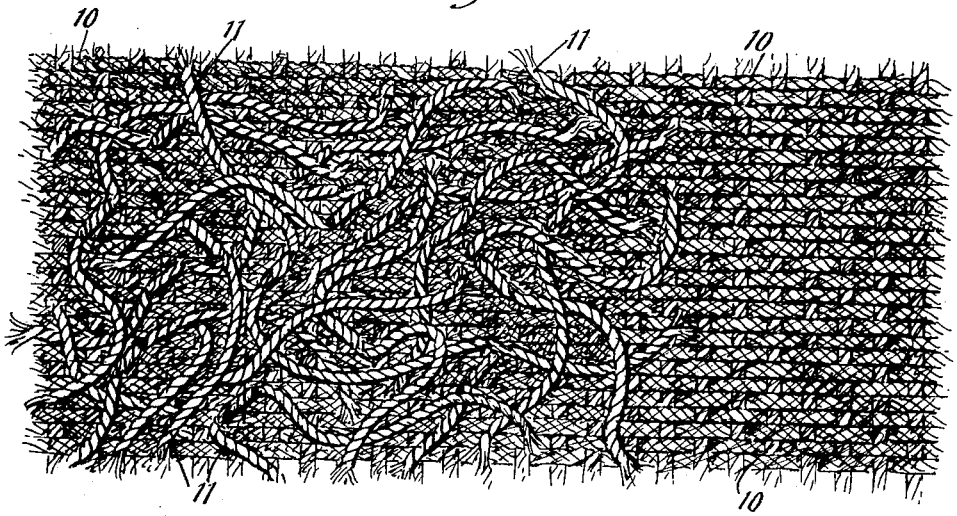
Figure 1 is a face view of a portion of the artificial hedge, lawn or similar article.
Figure 2:
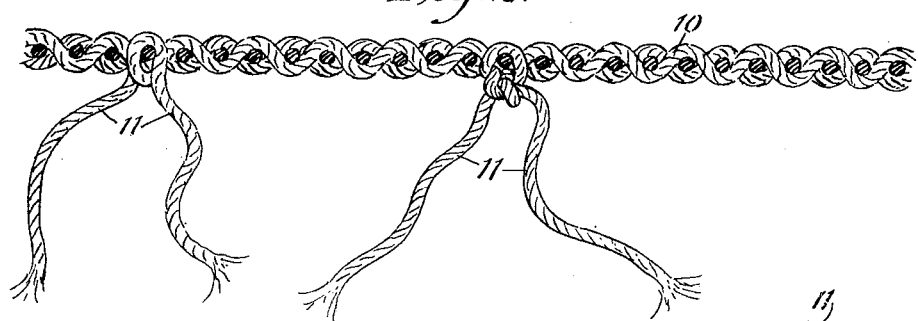
Fig. 2 is a sectional plan view of the same.
Figure 3:
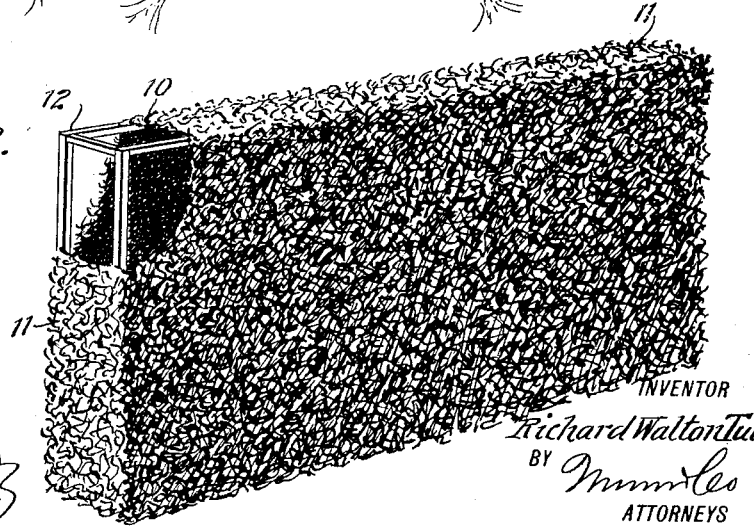
Fig. 3 is a perspective view of the article in the form of an artificial hedge with parts shown broken out.

It is understood that this article can be readily spread on the floor of the stage to resemble grass or it may be attached to supports 12, such as skeleton frames, for forming a hedge, for instance, as indicated in Fig. 3. The body 10 with its strands 11 fastened thereto as described may also be used for camouflage purposes or for decorating purposes, if desired.

Having thus described my invention, I claim as new and desire to secure by Letters Patent:

1. As an article of manufacture, an artificial hedge, lawn or similar article, comprising a textile fabric, and loose strands secured upon the outer face of the textile fabric and having free ends extending promiscuously from the said face of the fabric, said ends overlying one another and assuming various shapes.

2. As an article of manufacture, an artificial hedge, lawn or similar article, comprising a green textile fabric and short green strands tied approximately at their middle to the fabric and having relatively long free ends, strands extending loosely and promiscuously from the face of the fabric, said ends overlying one another and assuming various shapes.

3. As an article of manufacture, an artificial hedge, lawn or similar article, comprising a support and a covering for the same, the covering being made of a green textile weave attached to the frame, and short green textile strands tied approximately at their middle to the weave with their ends extending irregularly from the outer face of the weave, said ends overlying one another and assuming various shapes.

RICHARD WALTON TULLY.